Figure 1:
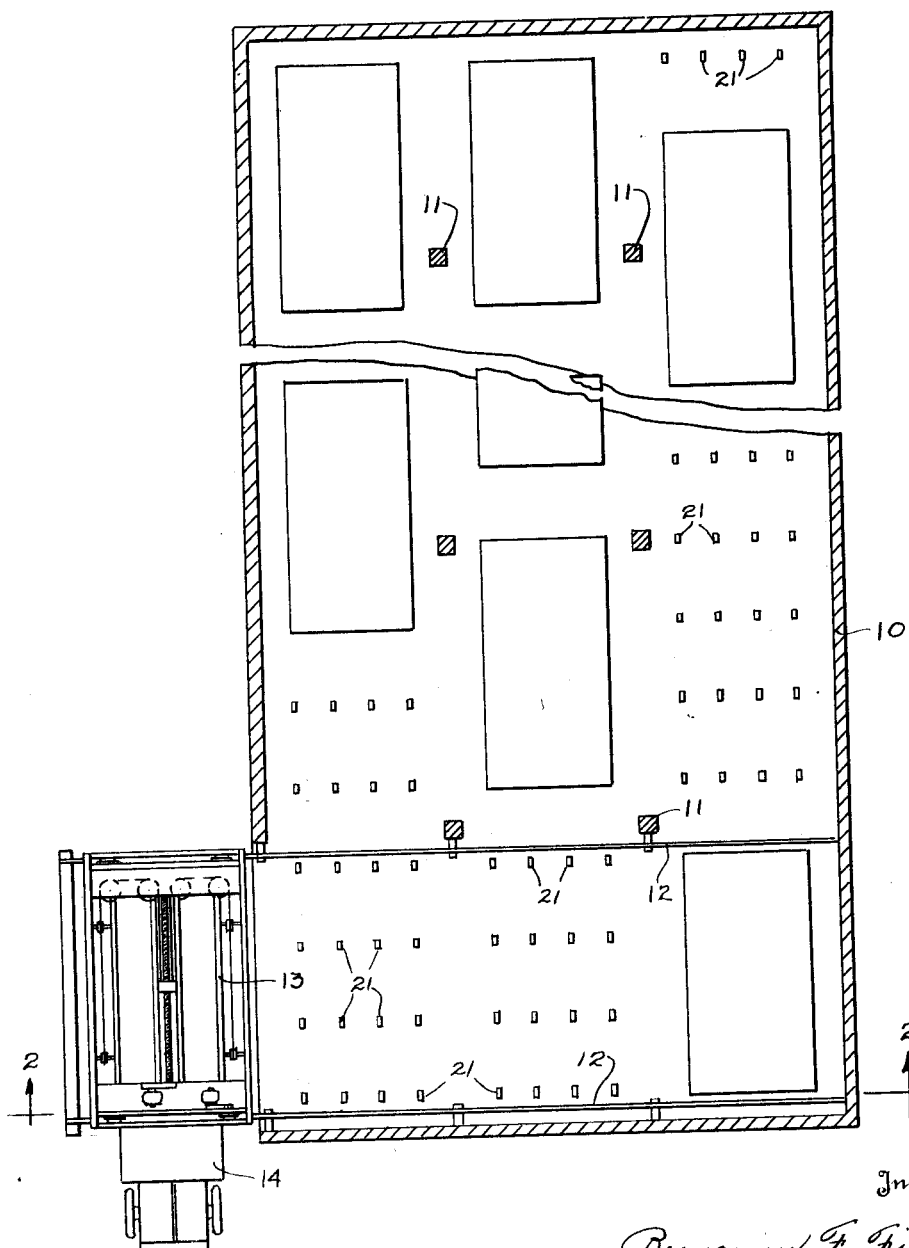

Jan. 12, 1932.  B. F. FITCH  1,840,574
FREIGHT HANDLING APPARATUS
Filed Nov. 5, 1928  3 Sheets-Sheet 1

Inventor
Benjamin F. Fitch
By Bates, Golrick & Teare
Attorneys

Jan. 12, 1932. B. F. FITCH 1,840,574
FREIGHT HANDLING APPARATUS
Filed Nov. 5, 1928  3 Sheets-Sheet 2

Inventor
Benjamin F. Fitch
By Bates, Goldrick & Teare
Attorneys

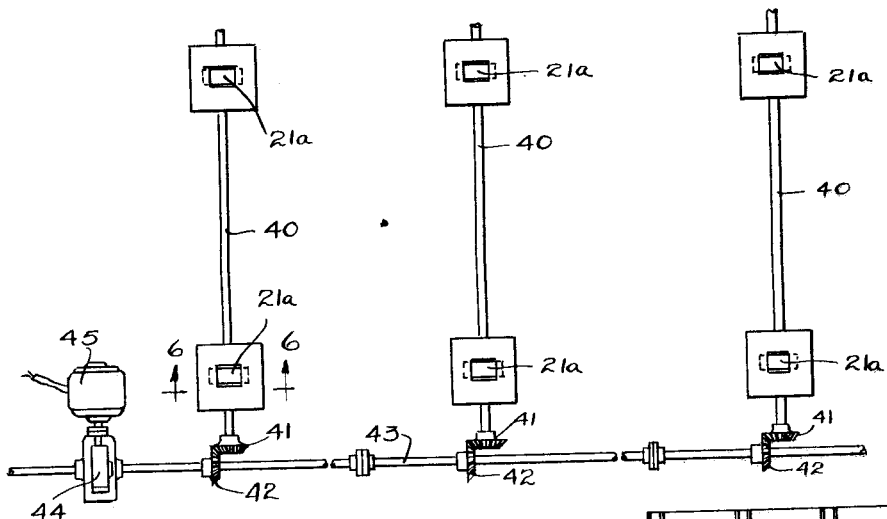
FIG.-5
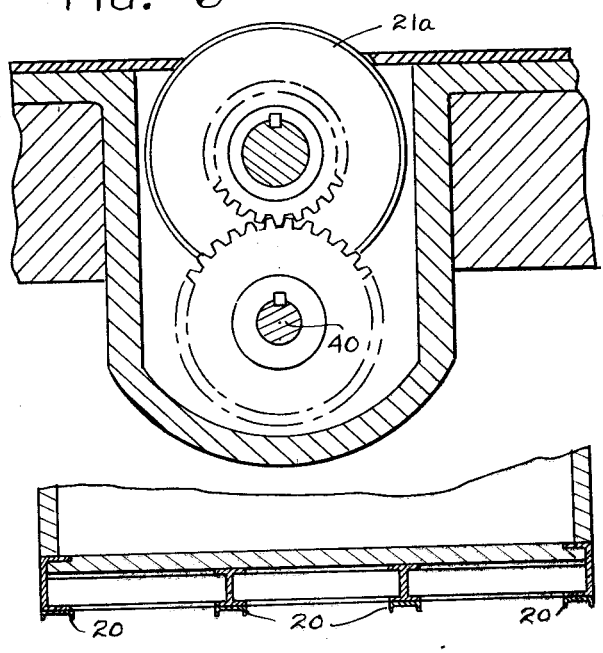
FIG.-6
FIG.-8
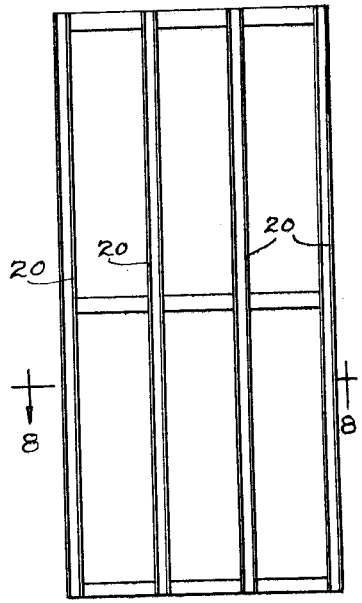
FIG.-7

Patented Jan. 12, 1932

1,840,574

UNITED STATES PATENT OFFICE

BENJAMIN F. FITCH, OF GREENWICH, CONNECTICUT, ASSIGNOR TO MOTOR TERMINALS COMPANY, OF WILMINGTON, DELAWARE, A CORPORATION OF DELAWARE

FREIGHT HANDLING APPARATUS

Application filed November 5, 1928. Serial No. 317,225.

The employment of removable automobile bodies as containers for package freight permits the utilization of buildings for storage, and for rehandling for distribution, in localities where the expense of rail track terminals would be prohibitive. In many of such buildings, the overall clearance between the floor and ceiling precludes the use of individual crane trackways for handling heavy loaded bodies. The same condition exists in buildings which are used for inland or off-track freight stations, where the contents of the containers are interchanged and the freight is reallocated. I have provided a solution for this problem in my Patent #1,648,301 where I have illustrated, described and claimed anti-friction members which are mounted in the floor of a station platform and warehouse. The bottoms of the containers have trackways which engage such members and the members are arranged in rows, thus enabling the containers to be propelled across the platform or station floor without necessitating the use of wheels upon the containers.

To move a loaded container across such members with a reasonable degree of speed necessitates some source of power, such as an industrial truck, or other power apparatus which may be affixed to the station, and which utilizes cables for moving containers from one place to another. A stationary source of power is not practical, as it necessitates an objectionable number of power elements, with cables which lie above the floor surface and interfere with hand trucking across the platform. An industrial truck is objectionable in that too much space is required for enabling the truck to operate efficiently.

An object of the present invention is to permit loaded containers, as well as empty containers to be readily moved across anti-friction members on the floor, or platform, without necessitating the use of a mechanism which must be attached to the container and without requiring the use of an industrial truck. In addition, my invention contemplates the provision of mechanism which may be readily incorporated in existing structures in an expeditious manner, and which will permit movement of the containers across the floor without necessitating any mechanism projecting above the floor other than a small portion of the roller members.

I carry out my invention by providing a mechanism for operating the roller members upon which the container is resting. These members may be rotated in various ways, as by a motor directly connected to a roller, or by the use of line shafting for simultaneously operating a plurality of rollers from a common motor.

Figure 2:
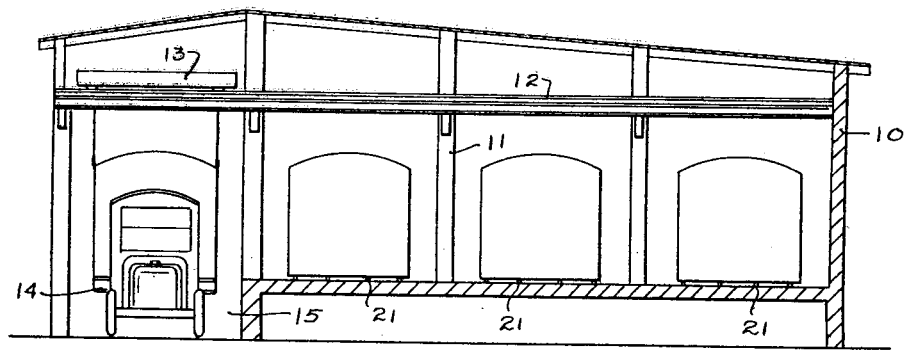
Figure 3:
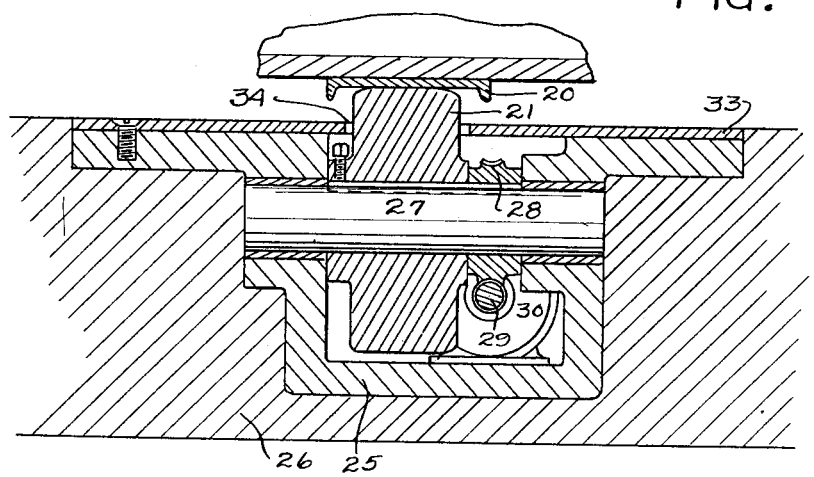
Figure 4:
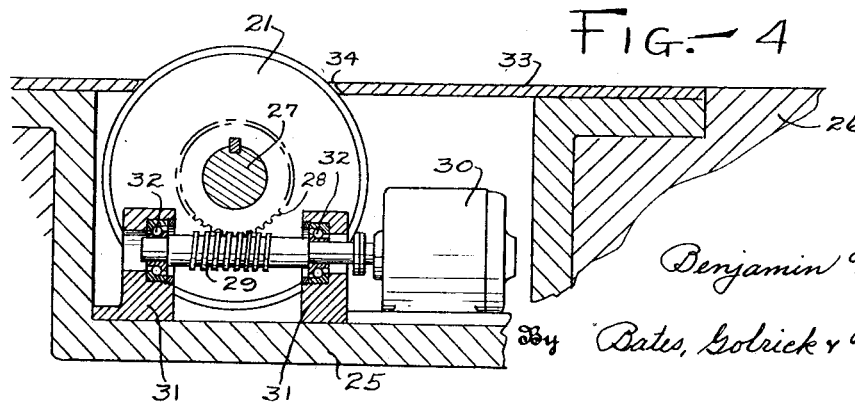

In the drawings, Fig. 1 shows a plan view of a station platform illustrating my invention; Fig. 2 is a vertical section taken through the station on the line 2—2 in Fig. 1; Fig. 3 is a transverse vertical section on an enlarged scale showing one form of mechanism for operating the roller members; Fig. 4 is a vertical transverse section through the mechanism shown in Fig. 3; Fig. 5 is a plan view showing a modified form of an operating mechanism for the roller members; Fig. 6 is a vertical transverse section on an enlarged scale taken on line 6—6 in Fig. 5; Fig. 7 is a bottom plan view of the container; and Fig. 8 is a section taken on the line 8—8 in Fig. 7.

I have shown my invention in connection with a suitable form of station indicated at 10, wherein columns 11 are arranged to provide aisleways along which containers may be moved. At the end of the station, a crane trackway is indicated at 12, along which a crane indicated in general at 13 is arranged to operate. The crane trackway extends transversely of the aisleways and functions to permit containers to be interchanged between a truck 14 and the station. A truck runway is indicated at 15 as extending alongside the station, while the trackway overhangs the truck runway.

Each container, as indicated in Figs. 7 and 8 has trackways in the nature of trough-shaped members 20, arranged in parallel relationship in a longitudinal direction of the container, with the trough portion facing downwardly. The floor of the station has anti-friction members shown as rollers 21 which are mounted beneath the floor, with a relatively small portion thereof projecting above the floor, as shown in Figs. 3, 4 and 6. The rollers are mounted in parallel rows spaced similarly to the spacing of the trackways on the containers.

In Figs. 3 and 4, the rollers are illustrated as being individually driven by small motors which are directly connected thereto. To this end, a housing in the nature of a stirrup 25 is imbedded within the floor 26, and provides a bearing for a shaft 27, which in turn supports the associated roller 21. The shaft 27 as shown in Figs. 3 and 4 also has rigidly fastened thereto, a worm wheel 28 which is actuated by a worm 29. In the preferred form, the worm is directly driven by the armature shaft of an electric motor 30, which is shown as being mounted upon the base of the stirrup. Suitable bearing blocks 31 support the worm shaft and provide adequate support for thrust bearings 32. A cover plate 33 protects the motor and driving mechanism, and yet permits access to the motor in an expeditious manner for inspection and repair purposes. The cover plate has an opening 34 through which part of the roller extends.

Each roller over the entire floor surface may be individually operable and the circuits controlling the same may be interconnected to allow any group or groups of rollers along a single row of containers to be operated at will. Some of the rollers may constitute idler wheels, while others may be motor driven. By operating the motors in groups, it is possible to move a single container a relatively short distance without necessarily moving any of the containers in the same row. This is useful when it is desired to move the end container in a row beneath the adjacent crane trackway, without disturbing the position of the remaining containers.

Referring now to Figs. 5 and 6, I have shown rollers 21a arranged in pairs, with each pair connected by a shaft 40, which extends transversely to the longitudinal direction of the container row. Each shaft 40 is illustrated as having affixed thereto a bevel gear 41, which intermeshes with a bevel gear 42 on a shaft 43. This last named shaft extends longitudinally of the container row and is operated through a worm and worm wheel connection indicated at 44, by an electric motor 45. Thus a plurality of rollers may be simultaneously operated, while a certain number of such rollers may be operated as a group by a single motor, independently of other groups. In this way, selectivity of operation is maintained and the number of motors required for moving a container a predetermined distance is reduced. For certain installations, the use of line shafting beneath the floor is prohibitive, and in such cases, I may find it expedient to use the individual motor control.

An important advantage of the present invention is the fact that containers may be moved about a station platform in an expeditious manner, without requiring the use of mechanism which projects above the floor of the platform, and without necessitating considerable floor space as would be necessary with an individual truck or tractor utilized for shifting the containers. The apparatus embodying my invention may be readily mounted beneath the floor, and may be easily incorporated in the construction of roller members which support the container while it is being transported across a floor surface.

I claim:

1. In combination, a platform floor, a series of isolated box-like housings mounted in the floor beneath the surface thereof, a roller axially journalled in each housing and having a portion thereof projecting a constant amount above the surface of the floor, and a driving member mounted in said housing and geared with said roller.

2. In combination, a platform floor having rows of openings therein, a series of hollow box-like members each having laterally extending flanges engaging the floor and supporting the member thereon, a roller axially journalled within the member, an electric motor within the member, and means operatively connecting the motor and roller.

In testimony whereof, I hereunto affix my signature.

BENJAMIN F. FITCH.